Figure 1:
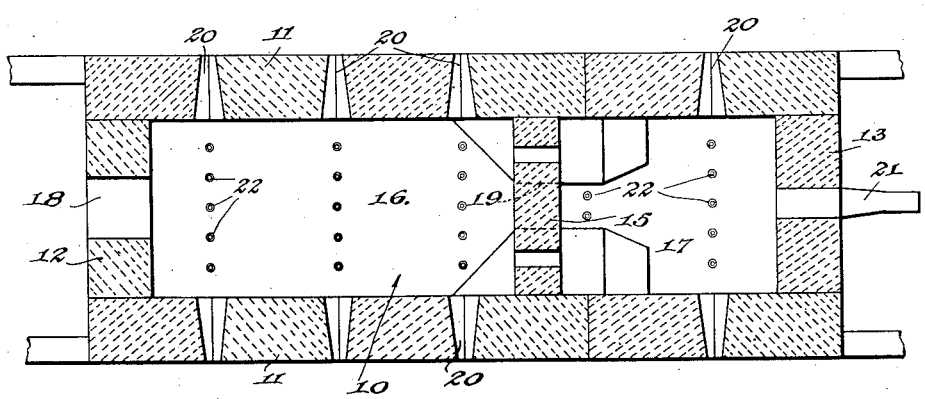

Oct. 5, 1943.   H. A. SHADDUCK   2,331,052
METHOD OF REFINING MOLTEN GLASS
Filed Nov. 27, 1941

Inventor
H. A. Shadduck,
By Rule & Hoge
Attorneys

Patented Oct. 5, 1943

2,331,052

UNITED STATES PATENT OFFICE 2,331,052

METHOD OF REFINING MOLTEN GLASS

Hugh A. Shadduck, Toledo, Ohio, assignor to Owens-Illinois Glass Company, a corporation of Ohio Application November 27, 1941, Serial No. 420,679

4 Claims. (Cl. 49—77)

My invention relates to methods of fining molten glass and provides a novel method of removing the so-called "seeds" or gas bubbles which permeate the glass when the batch is melted.

In the manufacture of ordinary glasses a refining process is necessary for removing the gas bubbles or seeds which permeate the glass when the batch materials are melted, to produce a glass of commercial quality. Various methods have been employed for this purpose in the manufacture of flint glass used for making bottles, jars, tumblers, sheet glassware, and numerous other articles. Large so-called "continuous tanks" are generally used in which the melting and fining operations are carried on as a continuous process. When the batch materials are melted the resulting molten mass is permeated with gas bubbles or seeds. This unrefined glass is advanced through a refining compartment or tank and maintained at a high temperature to permit the seeds to gradually rise to the surface and escape. Owing to the viscous nature of the glass, many hours are required for this fining process. Moreover, the extremely fine seeds are never completely removed by this method and for commercial purposes there is usually a compromise made between the time required for fining and the thoroughness of the fining operation.

In the preparation of optical glass it is common practice to agitate the molten glass as by a stirring process, for a sufficient length of time to fine the glass.

A further method which has been used to a very limited extent comprises the melting of glasses under a partial vacuum.

An object of my invention is to provide a practical method of refining the glass which will greatly reduce the length of time required and which also will remove the seeds more completely and thus produce a superior product.

More specifically, an object of the invention is to provide a novel method of fining molten glass by a bubbling process in which a plurality of specified gases of different chemical formulae are caused to pass in succession through the molten mass in the form of bubbles.

Heretofore it has been proposed to refine molten glass by passing certain gases therethrough such as carbon dioxide, carbon monoxide, oxygen, nitrogen, air and water vapor or steam. None of these gases used alone has proved entirely satisfactory. In accordance with the present invention certain specified gases are passed through the molten glass in succession and serve to satisfactorily refine the glass and at the same time avoid objections incident to the use of any particular gas alone.

Other objects of the invention will appear hereinafter.

Figure 2:
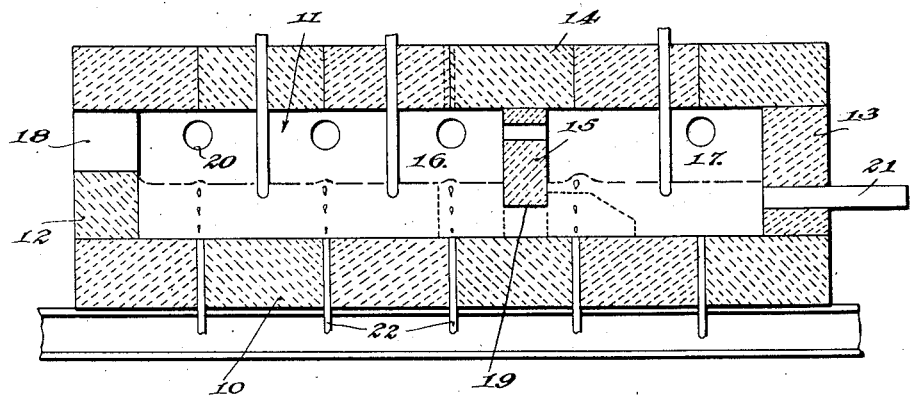

Referring to the accompanying drawing which illustrates an apparatus which may be used for practicing my invention:

Fig. 1 is a sectional plan view of the furnace.
Fig. 2 is a sectional elevation of the same.

The furnace is made of refractory material and comprises a floor 10, side walls 11, end walls 12 and 13, and a top wall or roof 14. A partition wall 15 may be provided for separating the furnace into the usual melting compartment 16 and refining compartment 17. The batch of raw materials is fed into the melting compartment through an opening 18 in the end wall 12. The melting and refining process is continuous. The batch is melted and partially refined in the chamber 16 and gradually moves forward and passes through an opening 19 in the partition 15, into the refining compartment 17. The batch is melted and the glass maintained at the required temperature by means of burners located at port openings 20 extending through the side walls of the furnace. The molten glass may be discharged through an outlet 21 in the end wall 13.

In practicing my invention, gases which are bubbled through the molten glass are supplied through pipes 22 which extend upwardly through openings and the floor of the furnace. Any desired number of pipes may be employed and they may be arranged in rows or otherwise distributed over the floor of the furnace. As shown, they are arranged in rows extending transversely of the furnace. The gas supplied under pressure to these pipes passes upward through the molten mass in the form of bubbles. The seeds which permeate the mass combine with these bubbles and are thus removed from the glass. I have found that the effectiveness of this method depends largely on the kind of gases employed and that superior results may be obtained by the use of a plurality of chemically different gases, preferably passed in succession through the molten glass.

I have made analyses of the seeds found in numerous samples of glass taken from various glass plants, showing the gases found in these seeds to be carbon dioxide, sulphur dioxide, a combination of $CO_2$ and $SO_2$, and small amounts of oxygen. The oxygen is usually associated with an inert gas, indicating entrapped air.

There is also evidence that some of the seeds consist merely of a vacuum. Practically no water (steam) has been found in the seeds.

The methods herein defined are adapted for refining all ordinary glasses, such as the flint glasses, lead glasses, etc., except the so-called water glasses which include sodium silicate and potassium silicate glasses, these hydrous glasses being soluble in water or capable of mixing with water in any proportion.

The fining operations as hereinafter described may be used, for example, with flint glasses but are not confined thereto. An example of such a flint glass may consist of $SiO_2$ 73%, CaO 10%, and $NaO_2$ 17%. I have discovered that when steam is bubbled through the "base mix," that is, the unrefined molten mass produced by melting the batch materials, it sweeps out practically all the dissolved gases except water vapor. Also oxygen, when bubbled through the molten mass, sweeps out practically all dissolved gases and is not itself retained in any considerable amount.

When oxygen is bubbled through the molten mass, it effectively removes not only dissolved gases but also practically all of the seeds. This results in a highly refined glass which is clear and transparent and in which any seeds which may be retained are of microscopic fineness. The use of oxyen in this manner, however, is impractical from a commercial standpoint, owing to cost of the gas and the considerable quantity required. When steam is bubbled through the molten glass, it has a marked refining effect, removing a large proportion of the seeds although the degree of refinement is not as high as with oxygen.

I have discovered that by passing certain gases in succession through the unrefined molten glass, superior results may be obtained. By bubbling steam through the glass and thereafter bubbling oxygen therethrough, the glass is highly refined. Also by the use of these two gases a comparatively small amount of oxygen is required. The expense is thus correspondingly reduced. Very satisfactory results may also be obtained by bubbling steam through the glass followed by air. The diluted oxygen in the air is somewhat less effective than pure oxygen but is sufficiently potent for practical purposes and has the advantage from a practical standpoint of being inexpensive.

I have discovered that the fining of molten glass is materially facilitated when the melting and refining is carried out in an atmosphere of steam which serves to decrease the viscosity of the molten mass, thus allowing the seeds more readily to escape. The water vapor apparently acts as a sort of catalyst. An atmosphere of steam may be used in this manner in combination with the bubbling process above described.

Modifications may be resorted to within the spirit and scope of my invention.

I claim:

1. The method which comprises bubbling steam through a molten mass of glass and thereafter bubbling oxygen through said mass.

2. The method which comprises melting glass batch, bubbling steam therethrough, and thereafter bubbling air through the mass.

3. The method which comprises melting glass batch, enveloping the molten glass in an atmosphere of steam, and bubbling steam and thereafter a gas containing oxygen through the mass while enveloped in said atmosphere of steam.

4. The method which comprises melting glass batch, the major constituents of which are silicon dioxide, calcium oxide, and sodium oxide, and fining the molten mass by bubbling therethrough steam and thereafter an oxidizing gas.

HUGH A. SHADDUCK.